United States Patent
Allan et al.

(10) Patent No.: US 9,533,907 B1
(45) Date of Patent: Jan. 3, 2017

(54) METHODS AND APPARATUS FOR PREDICTING GLASS DYNAMICS

(71) Applicants: Douglas Clippinger Allan, Corning, NY (US); Adam James Ellison, Painted Post, NY (US); Xiaoju Guo, Painted Post, NY (US); Timothy James Kiczenski, Corning, NY (US); John Christopher Mauro, Corning, NY (US); Marcel Potuzak, Corning, NY (US)

(72) Inventors: Douglas Clippinger Allan, Corning, NY (US); Adam James Ellison, Painted Post, NY (US); Xiaoju Guo, Painted Post, NY (US); Timothy James Kiczenski, Corning, NY (US); John Christopher Mauro, Corning, NY (US); Marcel Potuzak, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 13/662,652

(22) Filed: Oct. 29, 2012

Related U.S. Application Data (60) Provisional application No. 61/553,459, filed on Oct. 31, 2011.

(51) Int. Cl.
*C03B 5/24* (2006.01)
*C03B 5/00* (2006.01)

(52) U.S. Cl.
CPC ........................ *C03B 5/24* (2013.01)

(58) Field of Classification Search
CPC .............. C03B 5/00; C03B 5/24; C03B 5/245
USPC ................................. 65/66, 29.11
See application file for complete search history.

(56) References Cited

U.S. PATENT DOCUMENTS

2008/0066498 A1* 3/2008 Markham et al. ........... 65/29.16
2012/0083915 A1 4/2012 Allan et al.

OTHER PUBLICATIONS

Mauro, John C. et al. "Nonequilibrium Viscosity of Glass", Sep. 30, 2009, Physical Review B 80, 094204.*
Gupta et al. "Composition dependence of glass transition temperature and fragility. I. A topological model incorporating temperature-dependent constraints," J. Chem. Phys., 2009, 130:094503.
Mauro, et al., "Fictive Temperature and the Glassy State," J. Am. Ceram. Soc., 2009, 92:75-86.
Mauro, et al., "Nonequilibrium Viscosity of Glass," Physical Review B, 2009, 80:094204.
Mauro et al. "Composition dependence of glass transition temperature and fragility. II. A topological model of alkali borate liquids," J. Chem. Phys., 2009, 130:234503.
Mauro et al., "Viscosity of glass-forming liquids," PNAS, 2009, 106:19780-19784.
Mauro et al., "Enthalpy landscapes and the glass transition, " Sci. Model. Simul., 2008, 15:241-281.
Mauro et al., "Selenium glass transition: A model based on the enthalpy landscape approach and nonequilibrium statistical mechanics," Phys. Rev. B, 2007, 76:174202.
Mauro et al., "A Nonequilibrium statistical mechanical model of structural relaxation in glass," J. Am. Ceram. Soc., 2006, 89: 1091-1094.
Ritland, H. N., "Limitations of the Fictive Temperature Concept," J. Am. Ceram. Soc., 1956, 39:403-406.
Tandon et al., "Method to Estimate Thermal Shrinkage Behavoir of Glasses," Intl. J. Applied Glass Sci., 2011, 2:192-200.
Adam et al.; "On the Temperature Dependence of Cooperative Relaxation Properties in Glass-Forming Liquids"; The Journal of Chemical Physics 43, (1965); pp. 139-146.
Angell et al.; "Relaxation in glassforming liquids and amorphous solids"; Journal of Applied Physics 88, (2000); pp. 3113-3157.
Angell; "Relaxation in liquids, polymers and plastic crystals—strong/fragile patterns and problems"; Journal of Non-Crystalline 131-133 (1991); pp. 13-31.
Ellison et al.; "Glass Substrates for Liquid Crystal Displays"; International Journal of Applied Glass Science vol. 1, No. 1 (2010); pp. 87-103.
Fulcher; "Analysis of Recent Measurements of the Viscosity of Glasses"; J. Am. Ceram. Soc. 8 (1925); pp. 339-355.
Hagy; "Experimental Evaluation of Beam-Bending Method of Determining Glass Viscosities in the Range 108 to 1015 Poises"; J. Am. Ceram. Soc. 46 (1963); pp. 93-97.
Macdonald et al.; "Topological Derivation of Shape Exponents for Stretched Exponential Relaxation"; J. Chem. Phys. 122, 074510 (2005); pp. 1-21.
Mauro et al.; "Continuously broken ergodicity"; The Journal of Chemical Physics 126, 184511 (2007).

(Continued)

*Primary Examiner* — Angela Ortiz
*Assistant Examiner* — Cynthia Szewczyk
(74) *Attorney, Agent, or Firm* — Russell S. Magaziner (57) ABSTRACT

Computer-implemented methods and apparatus are provided for predicting/estimating (i) a non-equilibrium viscosity for at least one given time point in a given temperature profile for a given glass composition, (ii) at least one temperature profile that will provide a given non-equilibrium viscosity for a given glass composition, or (iii) at least one glass composition that will provide a given non-equilibrium viscosity for a given time point in a given temperature profile. The methods and apparatus can be used to predict/estimate stress relaxation in a glass article during forming as well as compaction, stress relaxation, and/or thermal sag or thermal creep of a glass article when the article is subjected to one or more post-forming thermal treatments.

8 Claims, 4 Drawing Sheets

(56) References Cited

OTHER PUBLICATIONS

Mauro et al.; "Impact of fragility on enthalpy relaxation in glass"; Physical Review E 78, 021502 (2008).

Mauro et al.; "Metabasin Approach for Computing the Master Equation Dynamics of Systems with Broken Ergodicity"; J. Phys. Chem. A 2007, 111; pp. 7957-7965.

Mauro et al.; "Monte Carlo method for computing density of states and quench probability of potential energy and enthalpy landscapes"; The Journal of Chemical Physics 126, 194103 (2007).

Mauro et al.; "Nonmonotonic Evolution of Density Fluctuations during Glass Relaxation"; Physical Review Letters 102, 155506 (2009).

Mauro et al.; "Split-Step Eigenvector-Following Technique for Exploring Enthalpy Landscapes at Absolute Zero"; J. Am. Chem. B 2006, 110; pp. 5005-5011.

Phillips; "Stretched exponential relaxation in molecular and electronic glasses"; Rep. Prog. Phys. 59 (1996); pp. 1133-1207.

Phillips; "Topology of Covalent Non-Crystalline Solids I: Short-Range Order in Chalcogenide Alloys"; Journal of Non-Crystalline Solids 34 (1979); pp. 153-181.

Scherer; "Editorial Comments on a Paper by Gordon S. Fulcher"; J. Am. Ceram. Soc., 75 [5] (1992); pp. 1060-1062.

Varshneya; "Chemical Strengthening of Glass: Lessons Learned and Yet to Be Learned"; International Journal of Applied Glass Science 1 [2] (2010); pp. 131-142.

Varshneya; "The physics of chemical strengthening of glass: Room for a new view"; Journal of Non-Crystalline Solids 356 (2010); pp. 2289-2294.

Zhang et al.; "Fragile-to-strong transition in metallic glass-forming liquids"; The Journal of Chemical Physics 133, 014508 (2010).

Scherer; Relaxation in Glass and Composites; Chapter 10 "Phenomenological Model of Structural Relaxation"; Krieger Publishing Company, Malabar, Florida, 1992; pp. 130-145.

Varshneya; Fundamentals of Inorganic Glasses Second Edition; Copyright Society of Glass Technology, 2006; pp. 216-240.

Anderson; "Through the Glass Lightly"; Science, vol. 267 (Mar. 17, 1995); pp. 1609-1618.

\* cited by examiner

METHODS AND APPARATUS FOR PREDICTING GLASS DYNAMICS

CROSS-REFERENCE TO RELATED APPLICATIONS

This application claims the benefit of priority under 35 U.S.C. §119 of U.S. Provisional Application Ser. No. 61/553,459, filed on Oct. 31, 2011, the content of which is relied upon and incorporated herein by reference in its entirety.

FIELD

This disclosure relates to methods and apparatus for predicting/estimating the non-equilibrium viscosity of glasses and/or glass-forming liquids (hereinafter referred to as "glass materials" or simply "materials").

DEFINITIONS AND CONVENTIONS

The terms "viscosity," "equilibrium viscosity," and "non-equilibrium viscosity" refer to shear viscosity, i.e., the response of the glass to an applied shear stress.

All viscosities referred to herein are assumed to have been divided by their units, e.g., Pa-s, to make numbers upon which the log function can operate.

As used herein, the glass transition temperature ($T_g(x)$) of a material is the temperature at which it has an equilibrium viscosity of $10^{12}$ Pa-s.

The term "glass article" is used in its broadest sense to include any object made wholly or partly of glass and/or a glass ceramic.

BACKGROUND

The problem of predicting the properties of glass materials has been a longstanding one in the field of glass and glass-ceramic chemistry. Because most glasses and glass-ceramics (referred to collectively herein as "glasses") contain a relatively large number of components, e.g., three to six or more in many cases, the compositional space is multi-dimensional, making experimental study of the entire space economically impractical. Yet, from melting through to forming, the production of glass articles would clearly benefit from an ability to predict/estimate glass properties based on glass composition or, conversely, to select glass compositions based on desired properties. Likewise, the ability to predict/estimate the behavior of glass articles during use, e.g., during post-forming thermal processing, would be of great value to the art.

Among all the technologically useful properties of a glass-forming system, the viscosity of the melt is undoubtedly among the most important. Every stage of industrial glass production—from the initial melting, mixing, and fining to the final forming operations—requires careful control of viscosity. For example, viscosity controls the rates of melting and of fining in a glass melting tank. Similarly, each glass forming operation, e.g., fiber forming or the final annealing of container glass, requires a certain well-defined viscosity range and consequently a specific temperature range for that operation. See, for example, Varshneya A K (2006) *Fundamentals of Inorganic Glasses*, 2nd ed. (Society of Glass Technology, Sheffield, UK).

Non-equilibrium viscosity is particularly important with regard to post-forming processing of glass articles. Specifically, non-equilibrium viscosity determines the relaxation rate of a final glass article (final glass product). As just one example, non-equilibrium viscosity controls the compaction behavior of display glasses (e.g., the glass sheets used as substrates in the production of liquid crystal displays) during customer heat treatment cycles. It should thus come as no surprise that the details of the viscosity-temperature-time relationship play a critical role in researching new glass compositions for display and other applications.

Among other reasons, the problem of relating equilibrium viscosity to temperature and composition is challenging because from the initial glass melting to final forming, viscosity varies by over twelve orders of magnitude. See, for example, Varshneya (2006), supra. Equilibrium viscosity is also sensitive to small changes in composition, especially in silicate melts where small levels of impurities can have a profound influence on the flow behavior. It is thus of great importance to have accurate knowledge of the scaling of viscosity with both composition (x) and temperature (T). Unfortunately, measurement of $\eta_{eq}(T,x)$ is challenging for high temperature melts, and low temperature measurements (i.e., in the high viscosity range, $10^{10}$ to $10^{15}$ Pa-s) are time consuming and often prohibitively expensive. See, for example, Varshneya (2006), supra. For non-equilibrium viscosities, the situation is even more complex because in addition to depending on composition (x) and current temperature (T), the non-equilibrium viscosity of a glass article also depends on the glass's thermal history, in particular, its thermal history from that point in time when it was last in thermal equilibrium with its surroundings.

In view of this state of the art, a need exists for more effective methods and apparatus for predicting/estimating the properties of glass materials and, in particular, for predicting/estimating the dependence of viscosity, specifically, non-equilibrium viscosity, on temperature, thermal history, and/or composition. The present disclosure addresses these problems.

SUMMARY

In accordance with a first aspect, a method is disclosed for making a glass article which includes:
  (I) melting batch materials to produce molten glass (e.g., melting batch materials using commercial, laboratory, experimental, or other glass making equipment now known or subsequently developed); and
  (II) forming a glass article from the molten glass (e.g., forming a glass article using commercial, laboratory, experimental, or other glass making equipment now known or subsequently developed);
  wherein:
    (A) the batch materials include a plurality of viscosity-affecting components which become at least part of the glass of the glass article (i.e., the viscosity-affecting components can make up the entire glass composition or only a part of the glass composition); and
    (B) the method is characterized by the viscosity-affecting components and/or their concentrations being at least partially based on a computer-implemented model which relates glass viscosity as a function of time to glass composition.

In accordance with a second aspect, a computer-implemented method is disclosed for:
  (i) predicting/estimating a non-equilibrium viscosity for at least one given time point in a given temperature profile for a given glass composition, the given temperature profile beginning with a time point at which the given glass composition is at equilibrium at a given temperature; or (ii) predicting/estimating at least one temperature profile that will provide a given non-equilibrium viscosity for a given glass composition, the temperature profile beginning with a time point at which the given glass composition is at equilibrium at a given temperature; or (iii) predicting/estimating at least one glass composition that will provide a given non-equilibrium viscosity for a given time point in a given temperature profile, the given temperature profile beginning with a time point at which the glass composition is at equilibrium at a given temperature;

the method including using a computer to evaluate at a series of time points an equation that relates non-equilibrium viscosity η to glass composition x, temperature T, and fictive temperature $T_f$, where $x=\{x_1, x_2, \ldots x_i \ldots x_N\}$ are concentrations of the glass's viscosity-affecting components, and T and $T_f$ are functions of time.

Apparatus for practicing the above methods, specifically, programmed computers and non-transitory computer readable storage media, is also disclosed.

With regard to the viscosity-affecting components of a glass composition, it should be noted that those components can include clusters of constituents and/or constituents that might in some contexts be considered contaminants, e.g., water which would be considered a contaminant in, for example, glasses used in optical waveguide fibers. In many cases, the basic constituents of the glass will be oxides, it being understood that the technology disclosed herein can also be used with non-oxide glasses if desired. As to units, the composition can be expressed in any convenient units, mole percent and weight percent being the most common choices.

The above summaries of the various aspects of the disclosure are only for the convenience of the reader and are not intended to and should not be interpreted as limiting the scope of the invention. More generally, it is to be understood that both the foregoing general description and the following detailed description are merely exemplary of the invention and are intended to provide an overview or framework for understanding the nature and character of the invention.

Additional features and advantages of the invention are set forth in the detailed description which follows, and in part will be readily apparent to those skilled in the art from that description or recognized by practicing the invention as exemplified by the description herein. The accompanying drawings are included to provide a further understanding of the invention, and are incorporated in and constitute a part of this specification. It is to be understood that the various features of the invention disclosed in this specification and in the drawings can be used in any and all combinations.

DETAILED DESCRIPTION

Relaxation behavior is of critical importance for many glass products. For example, liquid crystal display glass is subjected to thermal treatments during deposition of transistors on the glass substrate. Relaxation of the glass during these heat treatment cycles can lead to compaction, i.e., a permanent change in the dimensions of the glass. The quality of high purity fused silica depends on obtaining a uniform thermal history throughout the glass; any uneven relaxation effect will lead to a deterioration of the quality of the final product through birefringence and optical inhomogeneity. When glass sheets are used as substrates and subjected to elevated temperature during processing, glass relaxation can cause thermal sag or creep. Low creep during customer processes can be a key aspect enabling successful products. In another context, the amount of Rayleigh scattering exhibited by glass optical fibers is controlled by density fluctuations in the glass, which exhibit nonmonotonic relaxation behavior as the glass relaxes.

Thus, accurate predictions/estimates of glass relaxation is vital to all glass products. There are two important factors governing glass relaxation: thermodynamics and kinetics. Thermodynamically, glass is a non-equilibrium system that would like to relax to the metastable supercooled liquid state. This relaxation typically involves a continuous change in the volume, enthalpy, and other properties of the glass as it approaches the liquid state. While the presence of a thermodynamic driving force is a necessary condition for glass relaxation, by itself it is insufficient since the glass must also have enough thermal energy and/or time to enable the kinetics of relaxation. Assuming isobaric conditions, the kinetics of the glass depend on three factors: composition, temperature, and thermal history. The importance of thermal history cannot be overstated, since the dynamics of two glasses of the same composition and at the same temperature can vary by many orders of magnitude depending on the details of thermal history.

In accordance with the present disclosure, methods and apparatus are provided for predicting/estimating the composition dependence of glassy dynamics. The techniques described herein are based on enthalpy landscape and temperature-dependent constraint theories, a discussion of which can be found in Mauro, et al., "Nonequilibrium Viscosity Of Glass," Physical Review B, 2009, 80:094204, the content of which in its entirety is incorporated herein by reference.

Example 1 set forth below illustrates the efficacy of the methods disclosed herein. This example uses display glass compositions, i.e., glass compositions which during their normal use undergo post-forming thermal treatments, and thus the glassy dynamics of these compositions are of particular relevance to purchasers of these glass articles. The example further illustrates the ability to use experimental data for one glass (Glass A) to predict non-equilibrium viscosities of another glass (Glass B) without the need to make measurements of the non-equilibrium behavior of the second glass. This is an important aspect of the present disclosure because, among other things, it allows glass scientists to identify suitable glass compositions for particular applications without the need to fully characterize the compositions' non-equilibrium behavior by measuring that behavior for each new composition.

In an embodiment, the methods and apparatus for predicting/estimating non-equilibrium viscosity disclosed herein have as their base an equation of the form:

$$\log_{10}\eta(T,T_f,x) = y(T,T_f,x)\log_{10}\eta_{eq}(T_f,x) + [1-y(T,T_f,x)] \log_{10}\eta_{ne}(T,T_f,x) \quad (1)$$

In this equation, $\eta$ is the glass's non-equilibrium viscosity which is a function of composition through the variable "x", $\eta_{eq}(T_f,x)$ is a component of $\eta$ attributable to the equilibrium liquid viscosity of the glass evaluated at fictive temperature $T_f$ for composition x (hereinafter referred to as the "first term of Eq. (1)"), $\eta_{ne}(T,T_f,x)$ is a component of $\eta$ attributable to the non-equilibrium glassy-state viscosity of the glass at temperature T, fictive temperature $T_f$, and composition x (hereinafter referred to as the "second term of Eq. (1)"), and y is an ergodicity parameter which satisfies the relationship: $0 \leq y(T,T_f,x) < 1$.

In an embodiment, $y(T,T_f,x)$ is of the form:

$$y(T, T_f, x) = \left[\frac{\min(T, T_f)}{\max(T, T_f)}\right]^{p(x_{ref})m(x)/m(x_{ref})} \quad (2)$$

(For convenience, the product $p(x_{ref})m(x)/m(x_{ref})$ will be referred to herein as "p(x)".)

This formulation for $y(T,T_f,x)$ has the advantage that through parameter values $p(x_{ref})$ and $m(x_{ref})$, Eq. (2) allows all the needed parameters to be determined for a reference glass composition $x_{ref}$ and then extrapolated to new target compositions x. The parameter p controls the width of the transition between equilibrium and non-equilibrium behavior in Eq. (1), i.e., when the value of $y(T,T_f,x)$ calculated from Eq. (2) is used in Eq. (1). $p(x_{ref})$ is the value of p determined for the reference glass, e.g., Glass A of Example 1, by fitting to experimentally measured data that relates to relaxation, e.g., by fitting to beam bending data and/or compaction data. The parameter m relates to the "fragility" of the glass, with m(x) being for composition x and $m(x_{ref})$ being for the reference glass. The parameter m is discussed further below.

In an embodiment, the first term of Eq. (1) is of the form:

$$\log_{10}\eta_{eq}(T_f, x) = \quad (3)$$
$$\log_{10}\eta_\infty + (12 - \log_{10}\eta_\infty)\frac{T_g}{T_f} \cdot \exp\left[\left(\frac{m(x)}{12 - \log_{10}\eta_\infty} - 1\right)\left(\frac{T_g(x)}{T_f} - 1\right)\right]$$

In this equation, $\eta_\infty = 10^{-2.9}$ Pa·s is the infinite-temperature limit of liquid viscosity, a universal constant, $T_g(x)$ is the glass transition temperature for composition x, and, as discussed above, m(x) is the fragility for composition x, defined by:

$$m(x) = \left.\frac{\partial \log_{10}\eta_{eq}(T, x)}{\partial (T_g(x)/T)}\right|_{T=T_g(x)} \quad (4)$$

Both the glass transition temperature for composition x and the composition's fragility can be expressed as expansions which employ empirically-determined fitting coefficients. Such expansions are discussed in detail in co-pending, commonly-assigned U.S. patent application Ser. No. 12/896,355, entitled "METHODS AND APPARATUS FOR PREDICTING GLASS PROPERTIES," which was filed on Oct. 1, 2010, the content of which in its entirety is hereby incorporated herein by reference.

As discussed in the above application, the glass transition temperature expansion can be derived from constraint theory, which makes the expansion inherently nonlinear in nature. The fragility expansion can be written in terms of a superposition of contributions to heat capacity curves, a physically realistic scenario. The net result of the choice of these expansions is that Eq. (3) can accurately cover a wide range of temperatures (i.e., a wide range of viscosities) and a wide range of compositions.

As a specific example of a constraint theory expansion of glass transition temperature, the composition dependence of $T_g$ can, for example, be given by an equation of the form:

$$T_g(x) = \frac{K_{ref}}{d - \sum_i x_i n_i / \sum_i x_j N_j}, \quad (5)$$

where the $n_i$'s are fitting coefficients, d is the dimensionality of space (normally, d=3), the $N_j$'s are the numbers of atoms in the viscosity-affecting components of the glass (e.g., N=3 for $SiO_2$, N=5 for $Al_2O_3$, and N=2 for CaO), and $K_{ref}$ is a scaling parameter for the reference material $x_{ref}$, the scaling parameter being given by:

$$K_{ref} = T_g(x_{ref})\left(d - \frac{\sum_i x_{ref,i} n_i}{\sum_j x_{ref,j} N_j}\right), \quad (6)$$

where $T_g(x_{ref})$ is a glass transition temperature for the reference material obtained from at least one viscosity measurement for that material.

The summations in Eqs. (5) and (6) are over each viscosity-affecting component i and j of the material, the $x_i$'s can, for example, be expressed as mole fractions, and the $n_i$'s can, for example, be interpreted as the number of rigid constraints contributed by the various viscosity-affecting components. In Eqs. (5) and (6), the specific values of the $n_i$'s are left as empirical fitting parameters (fitting coefficients). Hence, in the calculation of $T_g(x)$ there is one fitting parameter for each viscosity-affecting component i.

As a specific example of a fragility expansion based on a superposition of heat capacity curves, the composition dependence of m can, for example, be given by an equation of the form:

$$m(x)/m_0 = \left(1 + \sum_i x_i \frac{\Delta C_{p,i}}{\Delta S_i}\right), \quad (7)$$

where $m_0 = 12 - \log_{10}\eta_\infty$, the $\Delta C_{p,i}$'s are changes in heat capacity at the glass transition, and the $\Delta S_i$'s are entropy losses due to ergodic breakdown at the glass transition. The constant $m_0$ can be interpreted as the fragility of a strong liquid (a universal constant) and is approximately equal to 14.9.

The values of $\Delta C_{p,i}/\Delta S_i$ in Eq. (7) are empirical fitting parameters (fitting coefficients) for each viscosity-affecting component i. Hence, the complete equilibrium viscosity model of Eq. (3) can involve only two fitting parameters per viscosity-affecting component, i.e., $n_i$ and $\Delta C_{p,i}/\Delta S_i$. Techniques for determining values for these fitting parameters are discussed in the above-referenced co-pending U.S. application incorporated herein by reference.

Briefly, in one embodiment, the fitting coefficients can be determined as follows. First, a set of reference glasses is chosen which spans at least part of a compositional space of interest, and equilibrium viscosity values are measured at a set of temperature points. An initial set of fitting coefficients is chosen and those coefficients are used in, for example, an equilibrium viscosity equation of the form of Eq. (3) to calculate viscosities for all the temperatures and compositions tested. An error is calculated by using, for example, the sum of squares of the deviations of log(viscosity) between calculated and measured values for all the test temperatures and all the reference compositions. The fitting coefficients are then iteratively adjusted in a direction that reduces the calculated error using one or more numerical computer algorithms known in the art, such as the Levenburg-Marquardt algorithm, until the error is adequately small or cannot be further improved. If desired, the process can include checks to see if the error has become "stuck" in a local minimum and, if so, a new initial choice of fitting coefficients can be made and the process repeated to see if a better solution (better set of fitting coefficients) is obtained.

When a fitting coefficient approach is used to calculate $T_g(x)$ and $m(x)$, the first term of Eq. (1) can be written more generally as:

$$\log_{10}\eta_{eq}(T_f,x) = C_1 + C_2 \cdot (f_1(x,FC1)/T_f) \cdot \exp([f_2(x,FC2)-1] \cdot [f_1(x,FC1)/T_f-1])$$

where:
(i) $C_1$ and $C_2$ are constants,
(ii) $FC1 = \{FC^1_1, FC^1_2 \ldots FC^1_i \ldots FC^1_N\}$ is a first set of empirical, temperature-independent fitting coefficients, and
(iii) $FC2 = \{FC^2_1, FC^2_2 \ldots FC^2_i \ldots FC^2_N\}$ is a second set of empirical, temperature-independent fitting coefficients.

Returning to Eq. (1), in an embodiment, the second term of Eq. (1) is of the form:

$$\log_{10}\eta_{ne}(T, T_f, x) = \quad (8)$$
$$A(x_{ref}) + \frac{\Delta H(x_{ref})}{kT\ln 10} - \frac{S_\infty(x)}{k\ln 10}\exp\left[-\frac{T_g(x)}{T_f}\left(\frac{m(x)}{12-\log_{10}\eta_\infty}-1\right)\right]$$

As can be seen, like Eq. (3), this equation depends on $T_g(x)$ and $m(x)$, and those values can be determined in the same manner as discussed above in connection with Eq. (3). A and $\Delta H$ could in principle be composition dependent, but in practice, it has been found that they can be treated as constants over any particular range of compositions of interest. Hence the full composition dependence of $\eta_{ne}(T,T_f,x)$ is contained in the last term of the above equation. The infinite temperature configurational entropy component of that last term, i.e., $S_\infty(x)$, varies exponentially with fragility. Specifically, it can be written as:

$$S_\infty(x) = S_\infty(x_{ref})\exp\left(\frac{m(x)-m(x_{ref})}{12-\log_{10}\eta_\infty}\right) \quad (9)$$

As with $p(x_{ref})$ discussed above, the value of $S_\infty(x_{ref})$ for the reference glass can be obtained by fitting to experimentally measured data that relates to relaxation, e.g., by fitting to beam bending data and/or compaction data.

When a fitting coefficient approach is used to calculate $T_g(x)$ and $m(x)$, the second term of Eq. (1) can be written more generally as:

$$\log_{10}\eta_{ne}(T,T_f,x) = C_3 + C_4/T - C_5 \cdot \exp(f_2(x,FC2) - C_6) \cdot \exp([f_2(x,FC2)-1] \cdot [f_1(x,FC1)/T_f])$$

where:
(i) $C_3$, $C_4$, $C_5$, and $C_6$ are constants,
(ii) $FC1 = \{FC^1_1, FC^1_2 \ldots FC^1_i \ldots FC^1_N\}$ is a first set of empirical, temperature-independent fitting coefficients, and
(iii) $FC2 = \{FC^2_1, FC^2_2 \ldots FC^2_i \ldots FC^2_N\}$ is a second set of empirical, temperature-independent fitting coefficients.

When a fitting coefficient approach is used to calculate $T_g(x)$ and $m(x)$ for both the first and second terms of Eq. (1), those terms can be written more generally as:

$$\log_{10}\eta_{eq}(T_f,x) = C_1 + C_2 \cdot (f_1(x,FC1)/T_f) \cdot \exp([f_2(x,FC2)-1] \cdot [f_1(x,FC1)/T_f-1]),$$

and $$\log_{10}\eta_{ne}(T,T_f,x) = C_3 + C_4/T - C_5 \cdot \exp(f_2(x,FC2) - C_6) \cdot \exp([f_2(x,FC2)-1] \cdot [f_1(x,FC1)/T_f]),$$

where:
$C_1$, $C_2$, $C_3$, $C_4$, $C_5$, and $C_6$ are constants,
(ii) $FC1 = \{FC^1_1, FC^1_2 \ldots FC^1_i \ldots FC^1_N\}$ is a first set of empirical, temperature-independent fitting coefficients, and
(iii) $FC2 = \{FC^2_1, FC^2_2 \ldots FC^2_i \ldots FC^2_N\}$ is a second set of empirical, temperature-independent fitting coefficients.

Although the use of glass transition temperature and fragility are preferred approaches for developing expressions for $f_1(x,FC1)$ and $f_2(x,FC2)$ in the above expressions, other approaches can be used, if desired. For example, the strain point or the softening point of the glass, together with the slope of the viscosity curves at these temperatures can be used.

As can be seen from Eqs. (1), (2), (3), (8), and (9), the computer-implemented model disclosed herein for predicting/estimating non-equilibrium viscosity can be based entirely on changes in glass transition temperature $T_g(x)$ and fragility $m(x)$ with composition x, which is an important advantage of the technique. As discussed above, $T_g(x)$ and $m(x)$ can be calculated using temperature dependent constraint theory and a superposition of heat capacity curves, respectively, in combination with empirically-determined fitting coefficients. Alternatively, $T_g(x)$ and $m(x)$ can be determined experimentally for any particular glass of interest, which is the approach used in Example 1 below.

In addition to their dependence on $T_g(x)$ and $m(x)$, Eqs. (1), (2), (3), and (8) also depend on the glass's fictive temperature $T_f$. A discussion of fictive temperature can be found in, for example, Mauro, et al., "Fictive Temperature and the Glassy State," J. Am. Ceram. Soc., 2009, 92:75-86, the content of which in its entirety is incorporated herein by reference. In accordance with the present disclosure, the calculation of the fictive temperature associated with the thermal history and glass properties of a particular glass composition can follow established methods, except for use of the non-equilibrium viscosity model disclosed herein to set the time scale associated with the evolving $T_f$. A non-limiting, exemplary procedure that can be used is as follows.

In overview, the procedure uses an approach of the type known as "Narayanaswamy's model" (see, for example, *Relaxation in Glass and Composites* by George Scherer (Krieger, *Florida*, 1992), chapter 10), except that the above expressions for non-equilibrium viscosity are used instead of Narayanaswamy's expressions (see Eq. (10.10) or Eq. (10.32) of Scherer).

A central feature of Narayanaswamy's model is the "relaxation function" which describes the time-dependent relaxation of a property from an initial value to a final, equilibrium value. The relaxation function $M(t)$ is scaled to start at 1 and reach 0 at very long times. A typical function used for this purpose is a stretched exponential, e.g.,:

$$M(t) = \exp\left(-\left(\frac{t}{\tau}\right)^b\right) \quad (10)$$

Other choices are possible, including:

$$M_s = \sum_{i=1}^{N} w_i \exp\left(-\alpha_i \frac{t}{\tau}\right) \quad (11)$$

where the $\alpha_i$ are rates that represent processes from slow to fast and the $w_i$ are weights that satisfy:

$$\sum_{i=1}^{N} w_i = 1 \quad (12)$$

The two relaxation function expressions of Eqs. (10) and (11) can be related by choosing the weights and rates to make $M_s$ most closely approximate $M$, a process known as a Prony series approximation. This approach greatly reduces the number of fitting parameters because arbitrarily many weights and rates N can be used but all are determined by the single stretched exponential constant b. The single stretched exponential constant b is fit to experimental data. It is greater than 0 and less than or equal to 1, where the value of 1 would cause the relaxation to revert back to single-exponential relaxation. Experimentally, the b value is found most often to lie in the range of about 0.4 to 0.7.

In Eqs. (10) and (11), t is time and $\tau$ is a time scale for relaxation also known as the relaxation time. Relaxation time is strongly temperature dependent and is taken from a "Maxwell relation" of the form:

$$\tau(T,T_f) = \eta(T,T_f)/G(T,T_f) \quad (13)$$

In this expression, $G(T, T_f)$ is a shear modulus although it need not be a measured shear modulus. In an embodiment, $G(T, T_f)$ is taken as a fitting parameter that is physically approximately equal to a measured shear modulus. $\eta$ is the non-equilibrium viscosity of Eq. (1), which depends on both T and $T_f$.

When relaxation proceeds during a time interval over which the temperature is changing, then the time dependence of both the temperature and the fictive temperature need to be taken into account when solving for time-varying fictive temperature. Because fictive temperature is involved in setting the rate of its own time dependence through Eq. (13), it shows up on both sides of the equation as shown below. Consistent with Eq. (11), it turns out that the overall fictive temperature $T_f$ can be represented as a weighted sum of "fictive temperature components" or modes in the form $$T_f = \sum_{i=1}^{N} w_i T_{fi} \quad (14)$$

using the same weights as before, i.e., the same weights as in Eqs. (11) and (12). When this is done, the time evolution of fictive temperature satisfies a set of coupled differential equations, where each of $T_f$, $T_{fi}$, and T are a function of time:

$$\frac{dT_{fi}}{dt} = \frac{\alpha_i}{\tau(T,T_f)}(T - T_{fi}) = \frac{G(T, T_f)\alpha_i}{\eta(T, T_f)}(T - T_{fi}), i = 1 \ldots N. \quad (15)$$

Note that the time evolution of fictive temperature components depends on the present value of the overall fictive temperature $T_f$ through the role of setting the time scale of relaxation through the viscosity. In this approach, it is only the viscosity that couples together the behavior of all the fictive temperature components. Recalling that the rates $\alpha_i$ and the weights $w_i$ are fixed by the single value of the stretching exponent b, they and $G(T, T_f)$ can be taken to be time-independent, although other choices are possible. When numerically solving the set of N equations of Eq. (15), the techniques used need to take into account both the fact that individual equations can have wildly different time scales and the manner in which $T_f$ occurs on the right hand side inside the viscosity.

Once the fictive temperature components are known at any given time through Eq. (15), the fictive temperature itself is calculated using Eq. (14). In order to solve Eq. (15) by stepping forward in time it is necessary to have initial values for all the fictive temperature components. This can be done either by knowing their values based on previous calculations or else by knowing that all the fictive temperature components are equal to the current temperature at an instant of time.

Eventually all calculations must have started in this way at some earlier time, i.e., at some point in time, the glass material must be at equilibrium at which point all the fictive temperature components are equal to the temperature. Thus, all calculations must be traceable back to having started in equilibrium.

It should be noted that within this embodiment, all knowledge of the thermal history of the glass is encoded in the values of the fictive temperature components (for a given set of the weights and so forth that are not time-dependent). Two samples of the same glass that share identically the same fictive temperature components (again, assuming all other fixed model parameters are the same) have mathematically identical thermal histories. This is not the case for two samples that have the same overall $T_f$, as that $T_f$ can be the result of many different weighted sums of different $T_{fi}$'s.

The mathematical procedures described above can be readily implemented using a variety of computer equipment and a variety of programming languages or mathematical computation packages such as MATHEMATICA (Wolfram Research, Champaign, Ill.), MATLAB (MathWorks of Natick, Mass.), or the like. Customized software can also be used. Output from the procedures can be in electronic and/or hard copy form, and can be displayed in a variety of formats, including in tabular and graphical form. For example, graphs of the types shown in the figures can be prepared using commercially available data presentation software such as MICROSOFT's EXCEL program or similar programs. Software embodiments of the procedures described herein can be stored and/or distributed in a variety of forms, e.g., on a hard drive, diskette, CD, flash drive, etc. The software can operate on various computing platforms, including personal computers, workstations, mainframes, etc.

Without intending to limit it in any manner, the invention will be further illustrated by the following examples. Among other things, the examples illustrate representative applications of the technology disclosed herein to glass making and glass processing.

It should, of course, be understood that these particular examples are not limiting and the technology disclosed herein can be employed in a variety of ways to understand and/or to improve glass manufacturing and glass processing. Also, the technology can be used to discover new glass compositions and/or to identify existing compositions that meet a desired set of viscosity criteria. For example, non-equilibrium viscosity predictions based on the present disclosure can be used to guide experimental composition research, to pre-screen candidate glasses so as to reduce the number of compositions that need to be melted, and/or to reduce the number of viscosity measurements that need to be performed. Further applications for the technology disclosed herein will be evident to skilled persons from the present disclosure.

EXAMPLE 1

This example illustrates the ability of Eqs. (1), (2), (3), and (8) to accurately predict/estimate the non-equilibrium viscosity of glass materials. In particular, this example uses beam bending experiments to establish that the above expressions accurately reproduce non-equilibrium viscosity for a range of glass compositions, temperatures, and thermal histories (i.e. fictive temperatures).

The beam bending tests used a rectangular beam of the glass material from which was hung a small weight. The beam was held at a fixed temperature and its small viscous deformations over time were accurately measured. The observed deflection and the underlying viscosity are related by $$y(t) = C \int_0^t \frac{dt'}{\eta(T(t'), T_f(t'))} \quad (16)$$

where y(t) is the deflection of the center of the beam at time t, $\eta$ is the non-equilibrium viscosity, and C is a standard beam-bending viscometry constant that takes account of the load hanging from the beam and the beam's geometry and is given by:

$$C = \frac{gL^3}{120wh^3}\left[M_{load} + \frac{\rho whL}{1.6}\right]. \quad (17)$$

In Eq. (17), g is the acceleration of gravity in cm/s$^2$, $\rho$ is the density of the glass bar in g/cm$^3$, $M_{load}$ is the total load mass in grams, L is the span or distance between supports, and w is the width and h is the (vertical) thickness of the beam. All of the lengths are measured in cm, such that the resulting C is in units of Pa-cm.

Two glasses were used in the experiments, one of which (Glass A) contained six components, i.e., SiO$_2$, Al$_2$O$_3$, B$_2$O$_3$, MgO, CaO, and SrO, and the other of which (Glass B) contained seven component, i.e., the same six as Glass 1 plus BaO. Both glasses were suitable for display applications, with Glass B having a higher strain point than Glass A.

The parameters used to model the non-equilibrium viscosity of the glasses are set forth in Table 1. Glass A was used as the reference glass and thus the parameters which are a function of $x_{ref}$ are for this glass. As noted above, $T_g(x)$ and m(x) are measured values for the two glasses.

Figure 1:
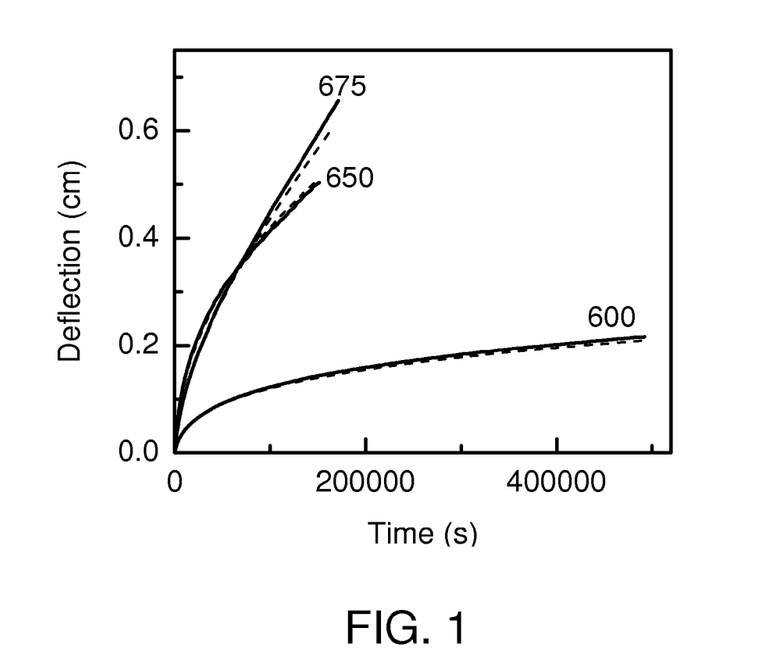
FIG. 1 is a plot comparing deflection versus time data from beam bending experiments (solid curves) with predicted results obtained using an embodiment of the non-equilibrium viscosity model disclosed herein (dashed curves). The glass used in the experiments and modeling was Glass A of Example 1.
Figure 2:
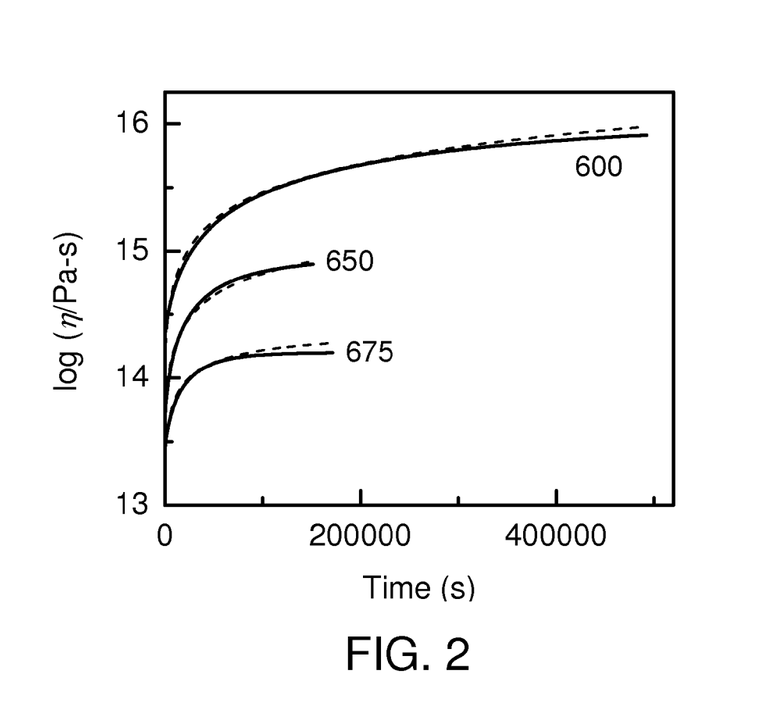
FIG. 2 is a plot of the viscosity behavior corresponding to the deflection behavior of FIG. 1.
Figure 3:
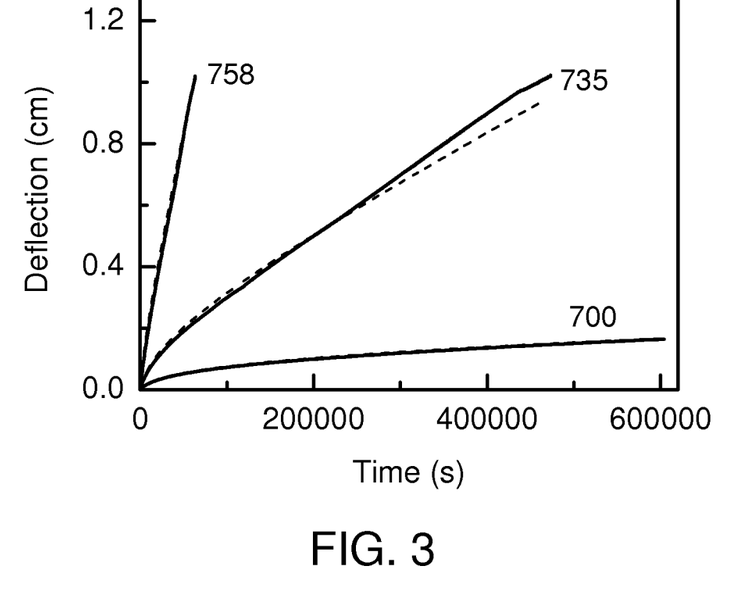
FIG. 3 is a plot comparing deflection versus time data from beam bending experiments (solid curves) with predicted results obtained using an embodiment of the non-equilibrium viscosity model disclosed herein (dashed curves). The glass used in the experiments and modeling was Glass B of Example 1.
Figure 4:
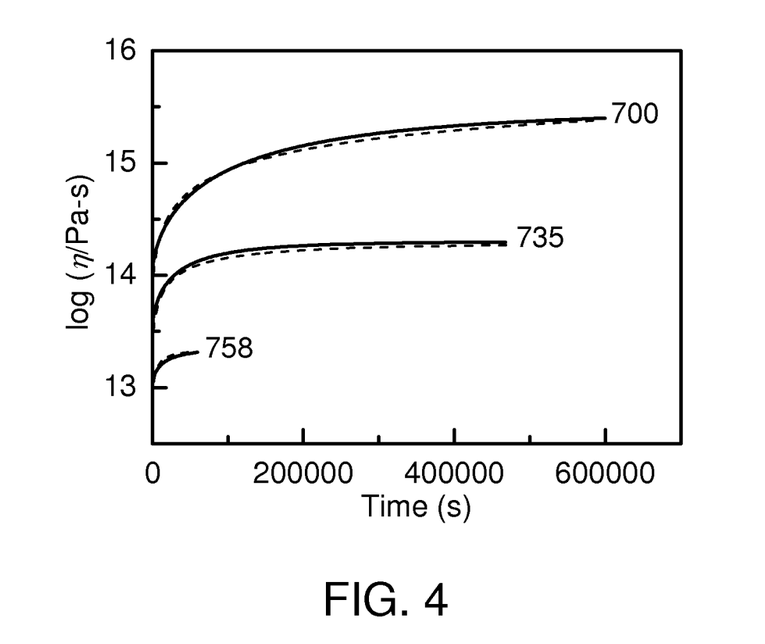
FIG. 4 is a plot of the viscosity behavior corresponding to the deflection behavior of FIG. 3.

The results for Glass A are shown in FIGS. 1-2 and those for Glass B in FIGS. 3-4. The curves in these figures are labeled by the temperature of the experiment (in degrees Celsius). All the experiments shown here were conducted under isothermal conditions.

In particular, FIG. 1 shows optimized model deflection curves for Glass A and FIG. 2 shows the corresponding viscosity curves. The solid curves are measured data from the beam bending experiments, and the dashed curves are model predictions obtained using the composition-dependent non-equilibrium viscosity model disclosed herein. The numbers next to the various curves are the temperatures in ° C. at which the beam was held during the experiments or assumed to be held during the modeling. The ability of the model to accurately predict/estimate glass dynamics is evident from these figures.

FIGS. 3 and 4 follow the same format as FIGS. 1 and 2 for Glass B. The holding temperatures are higher because Glass B is more heat resistant than Glass A. As noted above, the Glass B predicted behavior is based on Glass A as a reference glass with no additional fitting parameters.

The modeled viscosity and deflection of Glass B agree well with the experimental results. When the fictive temperature is much higher than the temperature where the beam is kept, the non-equilibrium viscosity component will play a more important role than the equilibrium component. This is shown in the beginning part of the deflection measurement. The high accuracy of this part proves the success of the composition-dependent non-equilibrium viscosity model. When the fictive temperature approaches the real temperature at long times, the equilibrium viscosity takes charge of the whole viscosity. The high accuracy for this part of the viscosity curve is good proof of the composition dependent equilibrium viscosity and also the $T_g$ and m values used in the model.

EXAMPLE 2

This example illustrates the use of the computer-implemented model discussed above to predict/estimate compaction of a glass article when the article is subjected to a post-forming thermal treatment. A representative example of a glass article for which compaction estimation is important is a glass substrate used in the manufacture of a display, such as, a liquid crystal display (LCD).

Glass substrates are typically produced by forming a glass ribbon from molten glass and then cutting individual glass sheets from the ribbon, which are subjected to various finishing operations prior to being provided to a display manufacturer. The glass ribbon can be produced by various techniques including the float and fusion processes. In each case, the process begins with molten glass which then goes through a cooling process, i.e., a known (given) temperature profile. The profile can be determined in various ways, a typical technique being to measure the temperature of the glass as it cools from the molten state using, for example, IR detectors.

Figure 5:
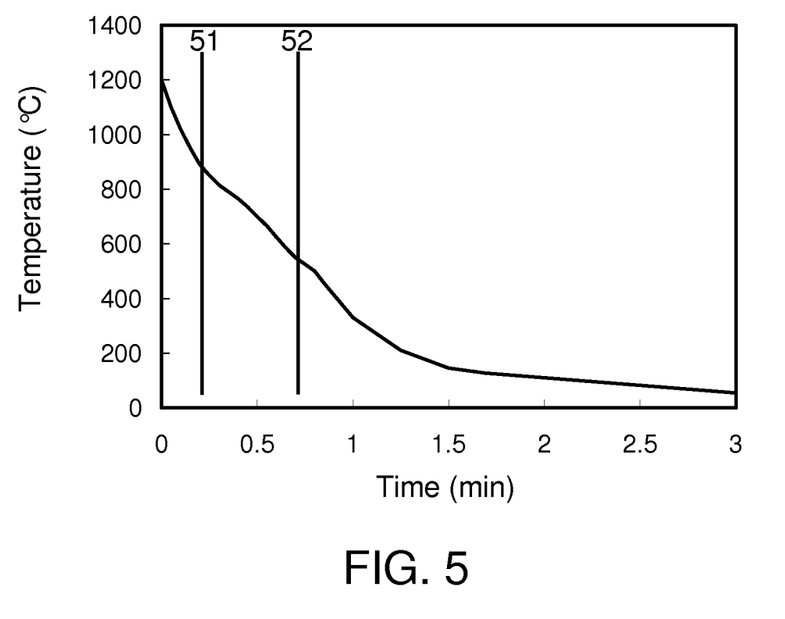
FIG. 5 is a non-limiting, representative plot of glass temperature versus time, i.e., a non-limiting, representative temperature profile, for a glass ribbon produced by a fusion process.

FIG. 5 shows a representative temperature profile for a fusion process. In this figure, vertical lines 51 and 52 divide the profile into three parts, the glass being in equilibrium with the ambient temperature to the left of line 51, being in transition to a solid state between lines 51 and 52 and thus no longer in equilibrium, and in a solid state to the right of line 52. As will be evident, the portion of the temperature profile to the right of line 52 includes cooling of the glass down to room temperature, whereupon it can be finished and shipped to a display manufacturer.

As discussed above in connection with Eq. (15), the thermal history of the glass shown in FIG. 5 can be expressed by a set of $T_{fi}$'s obtained by solving Eq. (15) for the temperature profile that the glass has experienced from the time it was in equilibrium, i.e., when it was to the left of line 51, until it was in a solid state, i.e., when it was to the right of line 52. This temperature profile is introduced into Eq. (15) through the T variable (temperature variable) which is a function of time. By determining the $T_{fi}$'s, the thermal history of the glass prior to any post-forming thermal treatment is captured in a manner which can be subsequently used in the non-equilibrium viscosity equations disclosed above.

Figure 6:
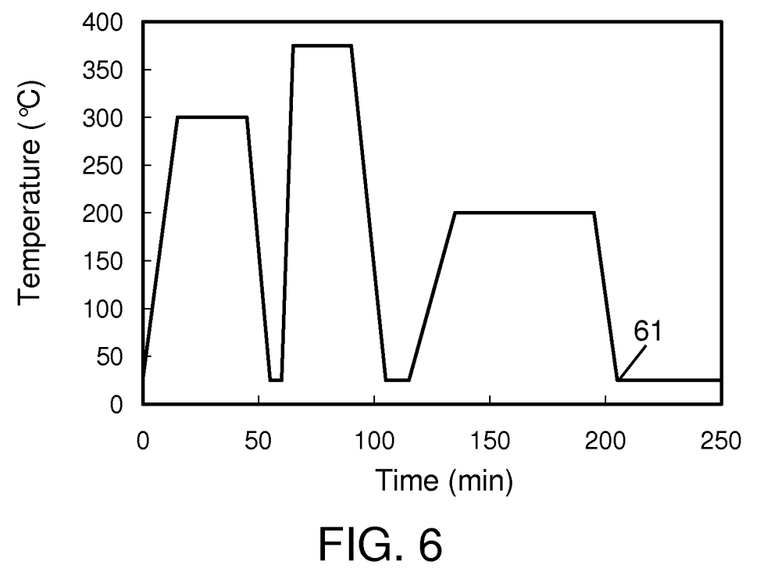
FIG. 6 is a non-limiting, representative plot of glass temperature versus time, i.e., a non-limiting, representative temperature profile, for a glass substrate during formation of an electronic component on the substrate.

For a glass substrate, the post-forming thermal treatment comes about as a result of the formation of electronic components on the substrate. The specifics of the thermal treatment will, of course, depend on the electronic components being produced, but as a general proposition, the thermal treatment includes a number of heating and cooling cycles. FIG. 6 shows a representative temperature profile for a typical post-forming thermal treatment used to produce (deposit) thin film transistors on a glass substrate.

To determine the compaction of the substrate due to a temperature profile of the type shown in FIG. 6, one begins with the $T_{fi}$'s determined for the temperature profile of FIG. 5. Using the $T_{fi}$'s, Eqs. (1), (2), (3), (8), and (14) are solved at a series of time points, where the T values in Eqs. (1), (2), and (8) are those of FIG. 6, and the x, $T_g(x)$, m(x), p(x), and $S_\infty(x)/k$ ln 10 values used in these equations are those of the glass making up the substrate. For example, these parameters can have values like those set forth in Table 1. It should be noted that Eq. (3) implicitly depends on the T values at the series of time points through its $T_f$ variable, which is calculated using Eq. (14) at each time point. Eq. (14) implicitly depends on the T values through the solution of Eq. (15) for the $T_{fi}$ values at each time point.

The resulting non-equilibrium viscosity versus time values obtained by solving Eqs. (1), (2), (3), (8), and (14) are then converted into fictive temperatures which, in turn, are converted into compaction values at one or more of the time points. In particular, compaction is defined as a linear strain of the glass at room temperature induced by the thermal cycle. Compaction ($\epsilon$) can be calculated as the product of the configurational coefficient of thermal expansion ($\alpha_{config}$) times the change in fictive temperature due to the thermal cycle, where by convention, a negative value of e indicates shrinkage and a positive value indicates expansion:

$$\epsilon = \alpha_{config}(T_f(t_1) - T_f(t_0)) \quad (18)$$

where $T_f(t_0)$ is the fictive temperature at the beginning of the thermal cycle, e.g., at the end of the temperature profile of FIG. 5, and $T_f(t_1)$ is the fictive temperature at the time of interest $t_1$ which often will be the end of the post-forming thermal treatment, e.g., at time point 61 in FIG. 6.

If the magnitude of the compaction value calculated from Eq. (18) is greater than desired, the computer-implemented model disclosed herein can be used to investigate potential changes that will improve the compaction. For example, the temperature profile of FIG. 5 and/or FIG. 6 can be varied and the calculations repeated to determine the direction and magnitude of the resulting predicted/estimated compaction.

Importantly, in addition to changing temperature profiles, the computer-implemented model disclosed herein allows for the composition of the glass to be changed and the calculations repeated with a new set of x, $T_g(x)$, m(x), p(x), and $S_\infty(x)/k$ ln 10 values. As discussed above, when the composition is changed, Eqs. (5), (7), and (9), and their associated equations, can be used to calculate the new $T_g(x)$, m(x), p(x), and $S_\infty(x)/k$ ln 10 values based on fitting parameters obtained for reference glasses having compositions appropriate to the glass being studied for compaction. This is an important advantage of the technology disclosed herein since it is often easier to change glass composition than to change temperature profiles.

EXAMPLE 3

This example illustrates the use of the computer-implemented model discussed above to predict/estimate stress relaxation of a glass article when the article is subjected to a post-forming thermal treatment. A representative example of a glass article for which stress relaxation is important is a glass substrate used in the manufacture of a portable electronic device, in particular, a glass substrate used to produce a scratch-resistant touch screen for such a device.

Figure 7:
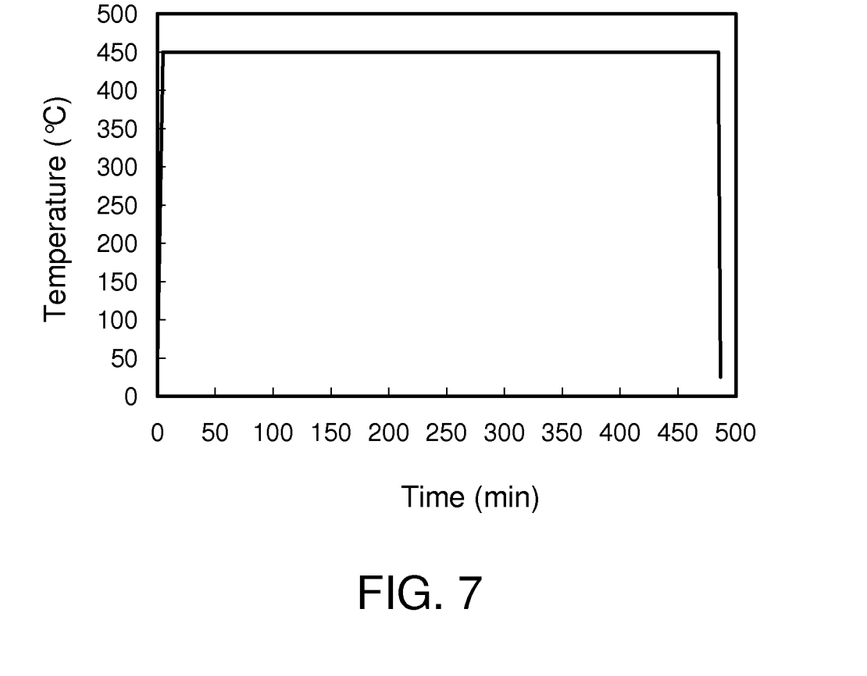
FIG. 7 is a non-limiting, representative plot of glass temperature versus time, i.e., a non-limiting, representative temperature profile, for a glass substrate during ion-exchange strengthening.

The scratch-resistant properties of such substrates can be produced by ion-exchange strengthening of the substrate. The ion-exchange process involves submerging the substrate in a molten salt bath at an elevated temperature and holding the substrate in the bath at that temperature to allow the ion-exchange process to take place. FIG. 7 shows a representative temperature profile for such an ion-exchange strengthening process. The ion-exchange process produces a compressive stress on the glass which gives the glass its elevated strength. However, the elevated temperature used to achieve ion-exchange allows the glass to relax and thus reduce the amount of stress and associated strengthening achieved by the ion exchange. Accordingly, the ability to predict/estimate the stress relaxation during ion-exchange allows a glass manufacturer to optimize the strengthening process.

The stress relaxation calculations follow a pattern similar to that described above in Example 2 for compaction. Thus, the calculations begin with a temperature profile for the forming process, e.g., a profile of the type shown in FIG. 5, and based on that profile, a set of $T_{fi}$'s are calculated to represent the thermal history of the glass at the end of the forming process. Next, as with compaction, the non-equilibrium viscosity of the glass at a series of time points is calculated using the temperature profile of the ion-exchange process, e.g., a profile of the type shown in FIG. 7. The non-equilibrium viscosity is then used to set the time scale for the stress relaxation of the glass as it is undergoing the stress enhancement from the ion exchange. Various techniques can be used to calculate the net effect of the competition between stress enhancement and stress relaxation, e.g., a commercial mechanical engineering software package such as that sold by ANSYS (Canonsburg, Pa.) can be used to model the overall process using the time scale obtained from the computer-implemented model disclosed herein.

As with compaction, if the calculated net stress is less than desired, variations can be made in the temperature profiles, such as the profiles of FIGS. 5 and 7, and/or in the composition of the glass. Again, being able to incorporate the effect of composition on stress relaxation is an important advantage of the technology disclosed herein. It should be noted that following analogous techniques, stress relaxation during forming of the glass article can also be predicted/estimated if desired.

EXAMPLE 4

This example illustrates the use of the computer-implemented model discussed above to predict/estimate thermal sag or thermal creep. A representative example of a glass article for which thermal sag or thermal creep is important is a glass substrate used in the manufacture of a photovoltaic panel. The problem of thermal sag/creep arises because when heated to an elevated temperature, a substrate can acquire a shape which becomes locked into (frozen into) the substrate when the substrate is cooled back to room temperature.

Figure 8:
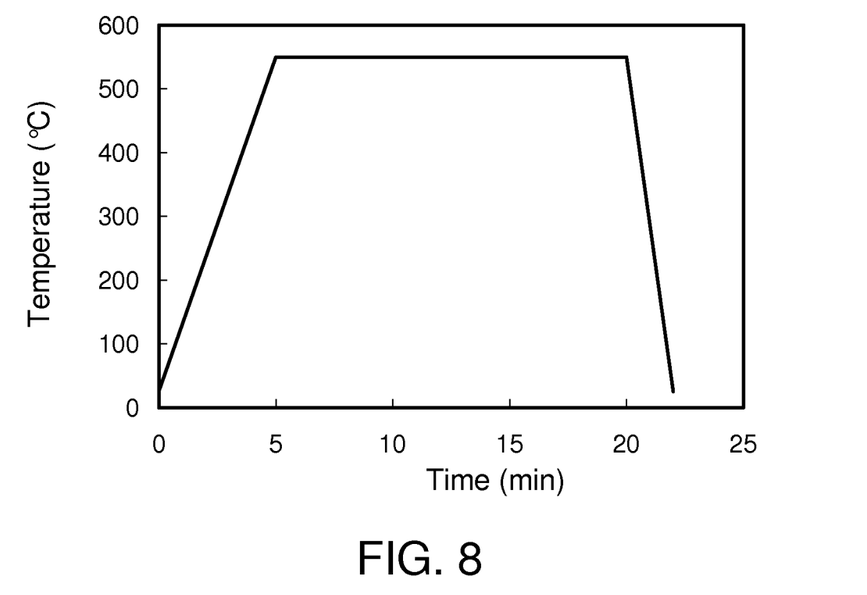
FIG. 8 is a non-limiting, representative plot of glass temperature versus time, i.e., a non-limiting, representative temperature profile, for a glass substrate during formation of a photovoltaic device on the substrate.

Again, the process begins with calculating a set of $T_{fi}$'s to represent the thermal history of the glass during formation, e.g., a thermal history of the type shown in FIG. 5. As with compaction and ion-exchange strengthening, a set of non-equilibrium viscosity values are then obtained for the temperature profile which the substrate is subjected to during manufacture of the photovoltaic panel. FIG. 8 illustrates a representative profile for such processing. The non-equilibrium viscosity values can then be used in, for example, a commercial mechanical engineering software package which, for example, employs a finite-element technique to model spatial behavior and thus predict the amount of sag/creep that the substrate will undergo. In some cases, the sag/creep can be estimated by using the behavior of a beam composed of the glass of interest, in which case an analytical solution of the type discussed above in connection with Eqs. (16) and (17) can be used.

As with other applications of the computer-implemented model, e.g., the compaction and ion-exchange strengthening applications discussed above in Examples 2 and 3, if the sag/creep is greater than desired, the model can be used to estimate/predict the effects of temperature profiles (thermal profiles) and/or glass composition on the behavior of the substrate during post-forming processing.

From the foregoing, it can be seen that improved techniques for predicting/estimating the properties of glass materials, specifically, a glass's non-equilibrium viscosity, have been provided. A variety of modifications that do not depart from the scope and spirit of the invention will be evident to persons of ordinary skill in the art from this disclosure. The following claims are intended to cover the specific embodiments set forth herein as well as modifications, variations, and equivalents of those embodiments.

TABLE 1

| Parameter | Units | Glass A | Glass B |
|---|---|---|---|
| log $\eta_\infty$ | log Pa-s | −2.9 | −2.9 |
| $T_g$ (x) | ° C. | 734.5 | 794 |
| m (x) | — | 35.3 | 36.8 |
| p (x) | — | 10.88 | 11.34 |
| A | log Pa-s | 45.19 | 45.19 |
| ΔH/k ln 10 | K | 4136.7 | 4136.7 |
| $S_\infty$(x)/k ln 10 | — | 135.09 | 149.40 |

What is claimed is:

1. A method of making a glass article comprising:
(I) melting batch materials to produce molten glass; and
(II) forming a glass article from the molten glass;
wherein:
 (A) the batch materials comprise a plurality of viscosity-affecting components which become at least part of the glass of the glass article; and
 (B) the method is characterized by said viscosity-affecting components and/or their concentrations having been selected at least in part using computer-implemented modeling that predicted/estimated the glass's non-equilibrium viscosity as a function of glass composition, temperature, and fictive temperature;
wherein the computer-implemented modeling used a computer to evaluate an equation of the form:

$$\log_{10}\eta(T,T_f,x)=y(T,T_f,x)\log_{10}\eta_{eq}(T_f,x)+[1-y(T,T_f,x)]\log_{10}\eta_{ne}(T,T_f,x)$$

where $\eta_{eq}(T_f,x)$ and $\eta_{ne}(T,T_f,x)$ are, respectively, equilibrium and non-equilibrium components of the glass's non-equilibrium viscosity $\eta$, T is temperature, $T_f$ if fictive temperature, and x is composition, and the function $y(T,T_f,x)$ satisfies the relationship:

$$0 \leq y(T,T_f,x) < 1.$$

2. The method of claim 1 wherein y(T,Tf,x) is of the form:

$$y(T, T_f, x) = \left[\frac{\min(T, T_f)}{\max(T, T_f)}\right]^{p(x_{ref})m(x)/m(x_{ref})}$$

where:
 (i) $X_{ref}$ is a reference composition;
 (ii) $p(x_{ref})$ is an empirically-determined constant for the reference glass;
 (iii) m(x) is given by:

$$m(x) = \frac{\partial \log_{10}\eta_{eq}(T,x)}{\partial (T_g(x)/T)}\bigg|_{T=T_g(x)}$$

where $T_g(x)$ is the glass's glass transition temperature; and
 (iv) $m(x_{ref})$ is m(x) for $x=x_{ref}$.

3. The method of claim 1 wherein $\log_{10}\eta_{eq}(T_f,x)$ and $\log_{10}\eta_{ne}(T,T_f,x)$ are of the form:

$$\log_{10}\eta_{eq}(T_f, x) = \log_{10}\eta_\infty + (12 - \log_{10}\eta_\infty)\frac{T_g(x)}{T_f} \cdot \exp\left[\left(\frac{m(x)}{12-\log_{10}\eta_\infty} - 1\right)\left(\frac{T_g(x)}{T_f} - 1\right)\right]$$

and $$\log_{10}\eta_{ne}(T, T_f, x) = $$
$$A(x_{ref}) + \frac{\Delta H(x_{ref})}{kT\ln 10} - \frac{S_\infty(x)}{k\ln 10}\exp\left[-\frac{T_g(x)}{T_f}\left(\frac{m(x)}{12-\log_{10}\eta_\infty}-1\right)\right]$$

where:
(i) $\eta_\infty = 10^{-2.9}$ Pa·s;
(ii) $x_{ref}$ is a reference composition;
(iii) $A(x_{ref})$ and $\Delta H(x_{ref})$ are empirically-determined constants for the reference glass;
(iv) k is Boltzmann's constant;
(v) $T_g(x)$ is the glass's glass transition temperature;
(vi) m(x) is given by:

$$m(x) = \left.\frac{\partial \log_{10}\eta_{eq}(T,x)}{\partial(T_g(x)/T)}\right|_{T=T_g(x)}$$

(vii) $S_\infty(x)$ is given by:

$$S_\infty(x) = S_\infty(x_{ref})\exp\left(\frac{m(x)-m(x_{ref})}{12-\log_{10}\eta_\infty}\right)$$

where $S_\infty(x_{ref})$ is an empirically-determined constant for the reference glass and $m(x_{ref})$ is m(x) for $x=x_{ref}$.

4. The method of claim 1 wherein the computer-implemented modeling predicted/estimated compaction of the glass article during a post-forming thermal treatment.

5. The method of claim 1 wherein the computer-implemented modeling predicted/estimated stress relaxation of the glass article during forming.

6. The method of claim 1 wherein the computer-implemented modeling predicted/estimated stress relaxation of the glass article during a post-forming thermal treatment.

7. The method of claim 1 wherein the computer-implemented modeling predicted/estimated thermal sag or thermal creep of the glass article during a post-forming thermal treatment.

8. The method of claim 7 wherein the thermal sag or creep was predicted/estimated using the computer-implemented modeling in combination with finite-element modeling which modeled spatial behavior of the glass article during the post-forming thermal treatment.

* * * * *